United States Patent
Marupaduga (10) Patent No.: US 11,612,012 B1
(45) Date of Patent: Mar. 21, 2023

(54) DRX CONTROL FOR WIRELESS USER EQUIPMENT

(71) Applicant: T-MOBILE INNOVATIONS LLC, Overland Park, KS (US)

(72) Inventor: Sreekar Marupaduga, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 180 days.

(21) Appl. No.: 17/025,891

(22) Filed: Sep. 18, 2020

(51) Int. Cl.
*H04W 76/28* (2018.01)
*H04W 74/08* (2009.01)
*H04W 52/02* (2009.01)
*H04W 88/14* (2009.01)

(52) U.S. Cl.
CPC ....... *H04W 76/28* (2018.02); *H04W 52/0206* (2013.01); *H04W 74/0808* (2013.01); *H04W 88/14* (2013.01)

(58) Field of Classification Search
CPC . H04W 88/14; H04W 76/28; H04W 52/0206; H04W 74/0808; H04W 52/0216; H04W 52/0225
See application file for complete search history.

(56) References Cited

U.S. PATENT DOCUMENTS

| | | | |
|---|---|---|---|
| 8,265,080 B2 | 9/2012 | Cai et al. | |
| 8,442,025 B2 | 5/2013 | Borsella et al. | |
| 8,626,167 B2 | 1/2014 | Futaki et al. | |
| 8,655,395 B2 | 2/2014 | Gaal et al. | |
| 8,811,250 B2 | 8/2014 | Cai | |
| 8,891,445 B2 | 11/2014 | Ishii | |
| 9,042,248 B2 | 5/2015 | Futaki | |
| 9,717,113 B2 | 7/2017 | Xu | |
| 2012/0327801 A1* | 12/2012 | Seo | H04B 1/74 370/252 |
| 2013/0286928 A1* | 10/2013 | Xu | H04W 52/0225 370/315 |
| 2015/0009816 A1* | 1/2015 | Hsu | H04W 52/0251 370/230.1 |
| 2015/0085841 A1* | 3/2015 | Sadek | H04J 3/16 370/336 |
| 2018/0317163 A1* | 11/2018 | Lee | H04W 48/18 |
| 2019/0239097 A1* | 8/2019 | Meylan | H04W 76/28 |
| 2021/0385747 A1* | 12/2021 | Prasad | H04W 28/24 |

* cited by examiner

*Primary Examiner* — Margaret G Mastrodonato (57) ABSTRACT

A wireless access node controls Discontinuous Reception (DRX) for User Equipment (UEs). The wireless access node exchanges user data with network elements over backhaul links and determines backhaul link performance. The wireless access node selects DRX schedules for the UEs based on the backhaul link performance and transfers the DRX schedules to the UEs. The UEs power their wireless receivers per their DRX schedules. The wireless access node transfers data notices to the UEs per the DRX schedules. The UEs wirelessly receive the data notices per their DRX schedules. The wireless access node transfers user data to the UEs per the DRX schedules and the data notices. The UEs wirelessly receive the user data per the DRX schedules and the data notices.

20 Claims, 8 Drawing Sheets

DRX CONTROL FOR WIRELESS USER EQUIPMENT

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have wireless access nodes which exchange wireless signals with the wireless user devices using wireless network protocols. Exemplary wireless network protocols include Fifth Generation New Radio (5GNR), Millimeter Wave (MMW), Long Term Evolution (LTE), Institute of Electrical and Electronic Engineers (IEEE) 802.11 (WIFI), and Low-Power Wide Area Network (LP-WAN).

Many wireless user devices have batteries to supply power—especially while mobile. To conserve the often-limited battery power in the wireless user devices, the wireless access nodes implement Discontinuous Reception (DRX). With DRX, a wireless user device powers down its wireless receiver for an off-time and then powers-up the wireless receiver to check with the wireless access node for a data notice. When a data notice is received, the wireless user device keeps its wireless receiver powered-up to receive user data per the data notice. When no data notice is received, the wireless user device powers the wireless receiver down for the off-time. The length of the off-time has a direct relation to the amount of battery conservation and to the amount of data latency. Unfortunately, the wireless access nodes do not control DRX off-times for the wireless user devices to effectively balance battery conservation with service delivery.

TECHNICAL OVERVIEW

A wireless access node controls Discontinuous Reception (DRX) for User Equipment (UEs). The wireless access node exchanges user data with network elements over backhaul links and determines backhaul link performance. The wireless access node selects DRX schedules for the UEs based on the backhaul link performance and transfers the DRX schedules to the UEs. The UEs power their wireless receivers per their DRX schedules. The wireless access node transfers data notices to the UEs per the DRX schedules. The UEs wirelessly receive the data notices per their DRX schedules. The wireless access node transfers user data to the UEs per the DRX schedules and the data notices. The UEs wirelessly receive the user data per the DRX schedules and the data notices.

DETAILED DESCRIPTION

Figure 1:
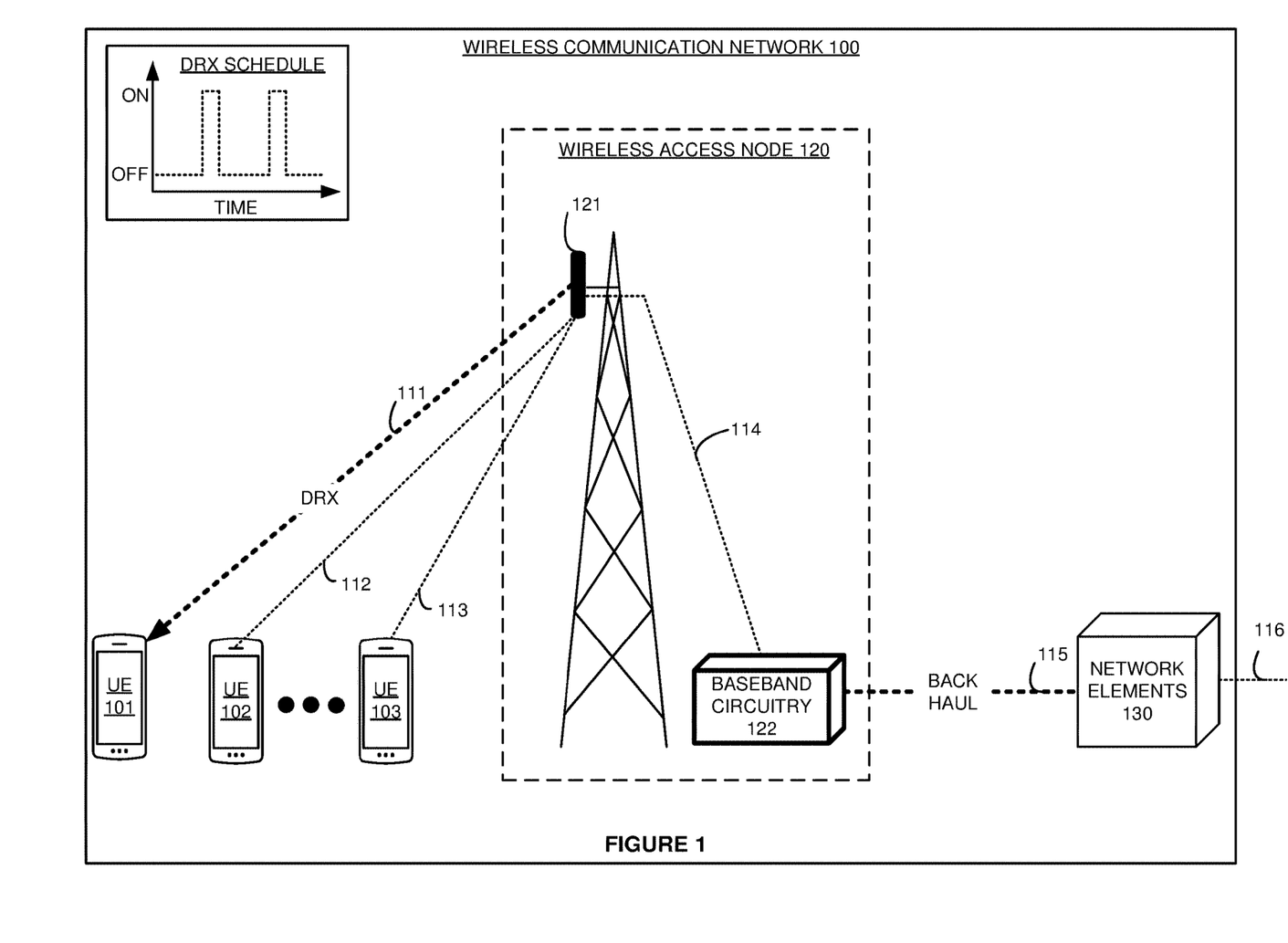
FIG. 1 illustrates a wireless communication network to control Discontinuous Reception (DRX) for a User Equipment (UE).

FIG. 1 illustrates wireless communication network 100 to control Discontinuous Reception (DRX) for User Equipment (UE) 101. Wireless communication network 100 delivers wireless data services like Internet-access, video-calling, media-streaming, augmented-reality, machine-control, and/or some other wireless networking product. Wireless communication network 100 comprises wireless UEs 101-103, wireless access node 110, and network elements 120. Wireless access node 110 comprises radio 111 and baseband circuitry 112. The amount of UEs that are depicted on FIG. 1 has been restricted for clarity, and wireless access node 110 typically serves many more UEs in the manner of UE 101-103.

Various examples of network operation and configuration are described herein. In some examples, UEs 102-103 and radio 121 wirelessly exchange user data over wireless links 112-113. Radio 121 and baseband circuitry 122 exchange the user data over interface links 114. Baseband circuitry 122 and network elements 130 exchange the user data over backhaul links 115. Network elements 130 and external systems exchange some of the user data over external links 116. Baseband circuitry 122 determines the data communication performance of backhaul links 115. For example, Baseband circuitry 122 may determine the average downlink throughput in megabits per second.

Baseband circuitry 122 selects a DRX schedule for UE 101 based on the data communication performance of backhaul links 115. The DRX schedule indicates when UE powers-up a wireless receiver to check network signaling and when UE 101 powers-down the wireless receiver to save battery power. The DRX schedule has additional rules to remain on when data notices and user data are received during an on-time. An exemplary DRX schedule is illustrated at the upper right. Typically, baseband circuitry 122 increases the DRX off-time for UE 101 in response to a decrease in backhaul performance. Baseband circuitry 122 typically decreases the DRX off-time for UE 101 in response to an increase in the backhaul performance. Baseband circuitry 122 transfers the DRX schedule to radio 121. Radio 121 wirelessly transfers the DRX schedule to UE 101. UE 101 powers on and powers off a wireless receiver per the DRX schedule.

Network elements 130 receive user data for delivery to UE 101. Network elements 130 transfer the user data to baseband circuitry 122. Baseband circuitry 122 waits for UE 101 per the DRX schedule. When UE 101 is receiving per the DRX schedule, baseband circuitry 122 transfers network signaling having a data notice for UE 101 to radio 121. Radio 121 wirelessly transfers the network signaling having the data notice to UE 101 over wireless link 111. UE 101 wirelessly receives the network signaling having the data notice per the DRX schedule. Baseband circuitry 122 transfers the user data for UE 101 to radio 121 per the DRX schedule and the data notice. Radio 121 wirelessly transmits the user data to UE 101. UE 101 wirelessly receives the user data over the wireless link 111 per the DRX schedule and the data notice.

Advantageously, wireless access node 120 controls DRX off-times for UE 101 to effectively balance battery conservation with service delivery. When backhaul quality suffers, the DRX off-time is lengthened to save battery. When the backhaul quality improves, the DRX off-time is shortened. Wireless access node 120 may consider additional factors like the radio channel size and channel occupancy when selecting the DRX schedule. In some examples, wireless access node has another radio that uses another frequency band, and baseband circuitry 122 controls DRX for UE 101 over the other radio in a similar manner. Baseband circuitry 122 could independently control the DRX of multiple additional radios.

UEs 101-103 wirelessly communicate with wireless access node 110 over wireless links 111-113 using Radio Access Technologies (RATs) like Fifth Generation New Radio (5GNR), Millimeter Wave (MMW), Long Term Evolution (LTE), Institute of Electrical and Electronic Engineers (IEEE) 802.11 (WIFI), Low-Power Wide Area Network (LP-WAN), and/or some other wireless protocol. The RATs use electromagnetic frequencies in the low-band, mid-band, high-band, or some other portion of the electromagnetic spectrum. Links 114-116 use metal, glass, air, or some other media. Links 114-116 use IEEE 802.3 (Ethernet), Time Division Multiplex (TDM), Data Over Cable System Interface Specification (DOCSIS), Internet Protocol (IP), 5GC, 5GNR, LTE, WIFI, virtual switching, inter-processor communication, bus interfaces, and/or some other data communication protocols.

Although UEs 101-103 are depicted as smartphones, UEs 101-103 might instead comprise computers, robots, vehicles, or some other data appliances with wireless communication circuitry. Radio 121 is depicted on a tower, but radio 121 may use other mounting structures or no mounting structure at all. Wireless access node 120 may comprise a gNodeB, eNodeB, MMW hot-spot, LP-WAN base station, and/or some other form of wireless network transceiver. Network elements 130 comprise Access and Mobility Management Functions (AMFs), User Plane Functions (UPFs), MMW controllers, Mobility Management Entities (MMEs), Gateways (GWs), Internet-of-Things (IoT) servers, Internet Protocol Multimedia Subsystem (IMS) servers, and/or some other form of wireless network apparatus. In some examples, network elements 130 comprise Virtual Network Functions (VNFs) in a Network Function Virtualization Infrastructure (NFVI).

UEs 101-103 and radio 121 comprise antennas, amplifiers, filters, modulation, analog/digital interfaces, microprocessors, software, memories, transceivers, bus circuitry, and the like. Baseband circuitry 122 and network elements 130 comprise microprocessors, memories, software, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, network applications, and management applications. The microprocessors retrieve the software from the memories and execute the software to drive the operation of wireless communication network 100 as described herein.

Figure 2:
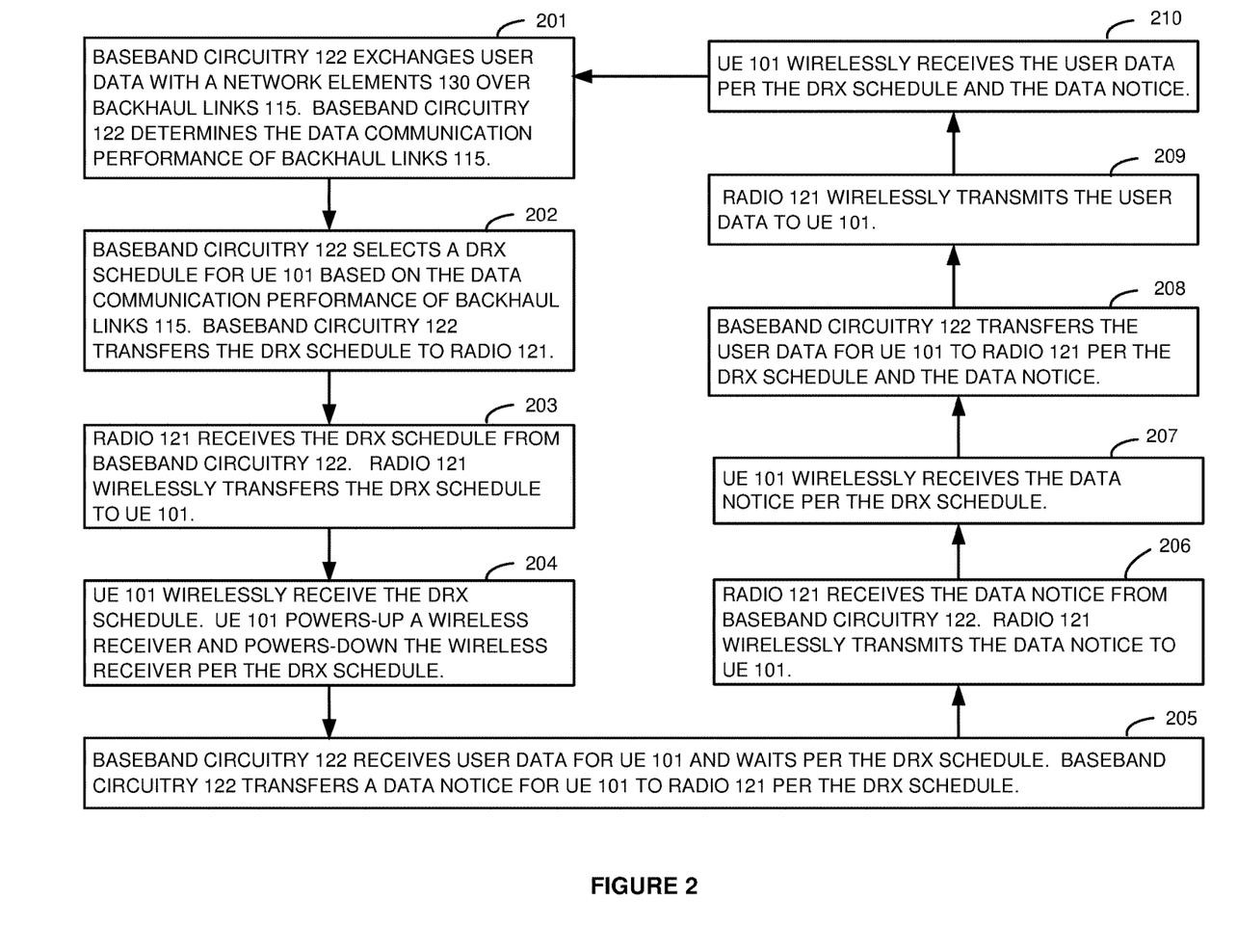
FIG. 2 illustrates an exemplary operation of the wireless communication network to control DRX for the UE.

FIG. 2 illustrates an exemplary operation of wireless communication network 100 to control DRX for UE 101. The operation may differ in other examples. Baseband circuitry 112 and network elements 130 exchange the user data over backhaul links 115 (201). Baseband circuitry 122 determines the performance of backhaul links 115 like average downlink throughput (201). Baseband circuitry 122 selects a DRX schedule for UE 101 based on the data backhaul performance (202). Baseband circuitry 122 transfers the DRX schedule to radio 121 (202). Radio 121 receives the DRX schedule from baseband circuitry 122 (203). Radio 121 wirelessly transfers the DRX schedule to UE 101 (203). UE 101 wirelessly receives the DRX schedule (204). UE 101 powers-up and powers-down a wireless receiver per the DRX schedule (204). Baseband circuitry 122 receives user data for delivery to UE 101 and waits per the DRX schedule (205). Baseband circuitry 122 transfers a data notice for UE 101 to radio 121 per the DRX schedule (205). Radio 121 receives the data notice from baseband circuitry 122 and wirelessly transfers the data notice to UE 101 (206). UE 101 wirelessly receives the data notice per the DRX schedule (207). Baseband circuitry 122 transfers the user data for UE 101 to radio 121 per the DRX schedule and the data notice (208). Radio 121 wirelessly transmits the user data to UE 101 (209). UE 101 wirelessly receives the user data per the DRX schedule and the data notice. The operation repeats (201).

Figure 3:
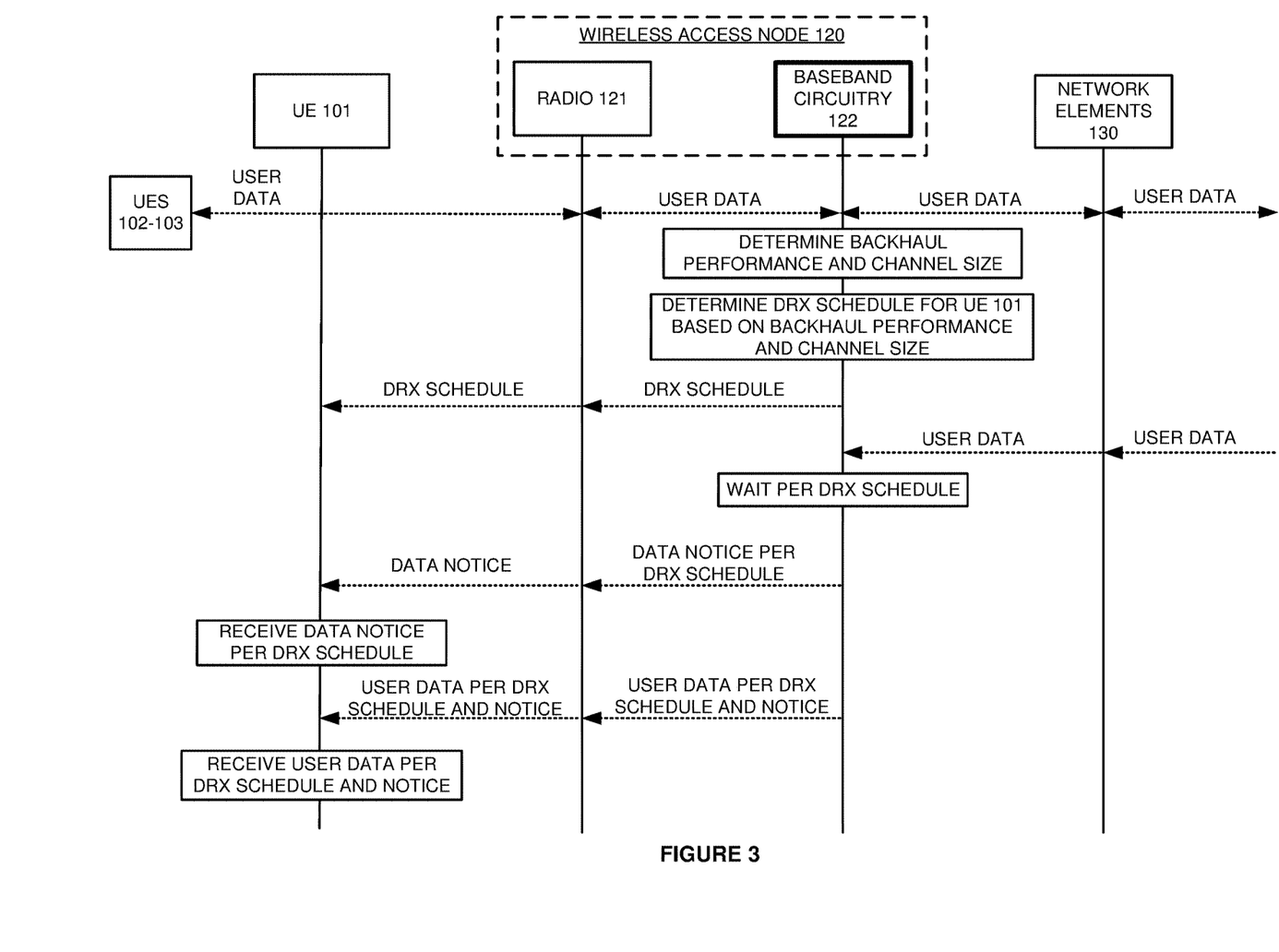
FIG. 3 illustrates an exemplary operation of the wireless communication network to control DRX for the UE.

FIG. 3 illustrates an exemplary operation of wireless communication network 100 to control DRX for UE 101. The operation may differ in other examples. UEs 102-103 and radio 121 wirelessly exchange user data. Radio 121 and baseband circuitry 122 exchange the user data. Baseband circuitry 122 and network elements 130 exchange the user data. Network elements 130 and external systems exchange at least some of the user data. Baseband circuitry 122 determines the data communication performance of backhaul links 115. Baseband circuitry 122 also determines the size of the radio channel that wirelessly couples UE 101 and radio 121. For example, the channel size might be 20 megahertz, 100 megahertz, or some other value. Baseband circuitry 122 selects a DRX schedule for UE 101 based on the backhaul performance and the channel size. Typically, baseband circuitry 122 increases DRX off-time for UE 101 in response to a backhaul performance decrease or a small channel size. Baseband circuitry 122 typically decreases DRX off-time for UE 101 in response to a backhaul performance increase or a large channel size. Increases on one factor may offset decreases in another factor.

Baseband circuitry 122 transfers the DRX schedule to radio 121. Radio 121 wirelessly transfers the DRX schedule to UE 101. Network elements 130 receive user data for delivery to UE 101. Network elements 130 transfer the user data to baseband circuitry 122. Baseband circuitry 122 waits for UE 101 per the DRX schedule. When UE 101 is receiving per the DRX schedule, baseband circuitry 122 transfers a data notice for UE 101 to radio 121. Radio 121 wirelessly transfers the data notice to UE 101. UE 101 wirelessly receives the data notice per the DRX schedule. Baseband circuitry 122 transfers user data for UE 101 to radio 121 per the DRX schedule and the data notice. Radio 121 wirelessly transmits the user data to UE 101. UE 101 wirelessly receives the user data over the wireless link 111 per the DRX schedule and the data notice.

Figure 4:
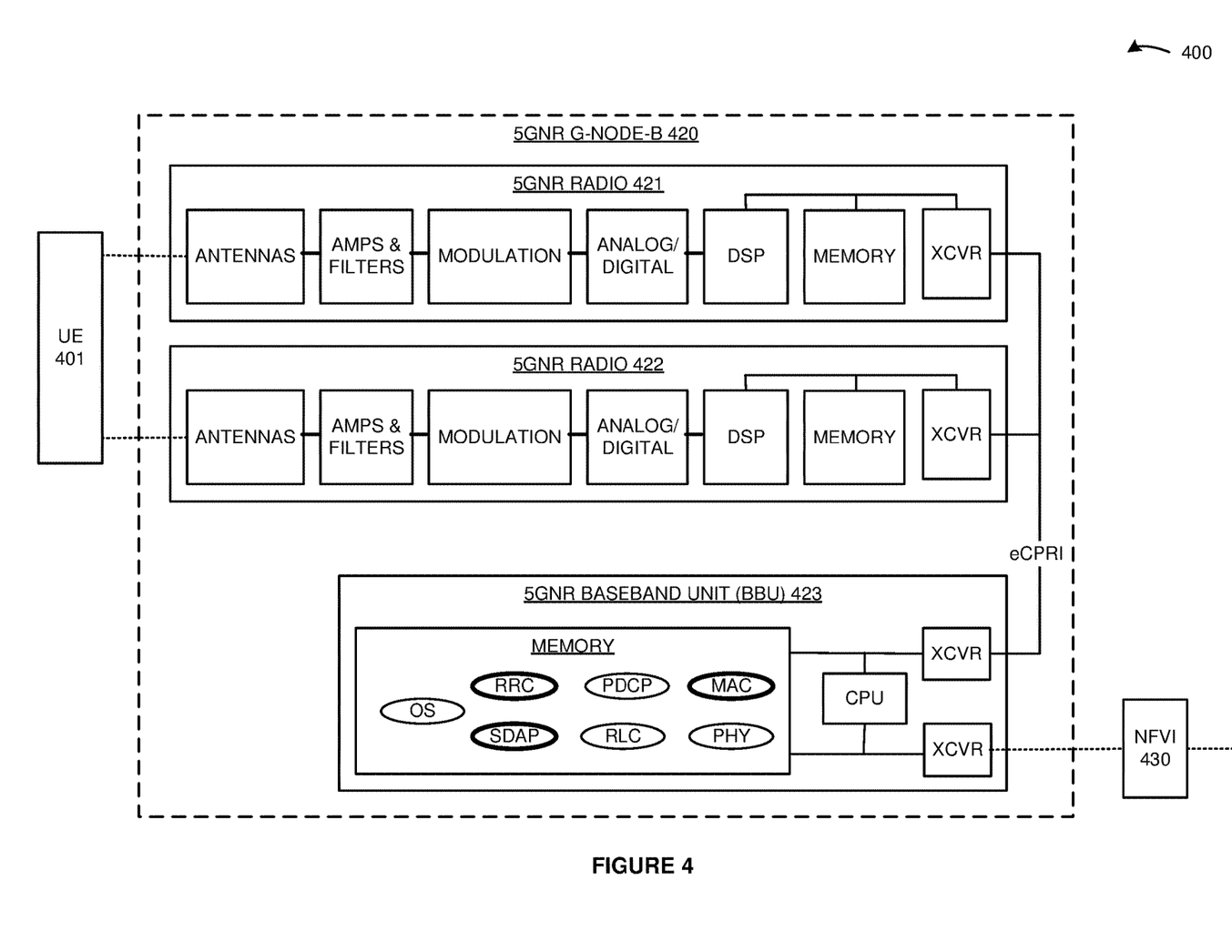
FIG. 4 illustrates a Fifth Generation New Radio (5GNR) gNodeB to control 5GNR DRX for a 5GNR UE in a Fifth Generation (5G) wireless communication network.

FIG. 4 illustrates Fifth Generation New Radio (5GNR) gNodeB 420 to control 5GNR DRX for 5GNR UE 401 in Fifth Generation (5G) wireless communication network 400. 5G communication network 400 comprises an example of wireless communication network 100, although network 100 may differ. 5G communication network 400 comprises UE 401, 5GNR gNodeB 420, and Network Function Virtualization Infrastructure (NFVI) 430. 5GNR gNodeB 420 comprises an example of wireless access node 120, although access node 120 may differ. 5GNR gNodeB 420 comprises 5GNR radios 421-422 and 5GNR Baseband Unit (BBU) 423. 5GNR radios 421-422 comprise antennas, amplifiers, filters, modulation, analog-to-digital interfaces, DSP, memory, and transceivers that are coupled over bus circuitry. 5GNR BBU 423 comprises memory, CPU, and transceivers that are coupled over bus circuitry. The memory in 5GNR BBU 423 stores an operating system and 5GNR network applications like Physical Layer (PHY), Media Access Control (MAC), Radio Link Control (RLC), Packet Data Convergence Protocol (PDCP), Service Adaptation Application Protocol (SDAP), and Radio Resource Control (RRC).

UE 401 is wirelessly coupled to the antennas in 5GNR radios 421-422. Transceivers in 5GNR radios 421-422 are coupled to transceivers in 5GNR BBU 423 over enhanced CPRI (eCPRI) links. A transceiver in 5GNR BBU 423 is coupled to NFVI 430 over backhaul links. The CPU in 5GNR BBU 423 executes the operating system, PHY, MAC, RLC, PDCP, SDAP, and RRC to exchange 5GNR signaling and data with UE 401 and to exchange 5G Core (5GC) signaling and data with NFVI 430 and other NodeBs. BBU 423 may be physically separated into a Distributed Unit (DU) and a Centralized Unit (CU) that each resemble BBU 423. The CU and DU would each host a portion of the software in BBU 423. The CU and DU would be coupled over fronthaul links.

In 5GNR radios 421-422, the antennas receive wireless 5GNR signals from UE 401 that transport uplink 5GNR signaling and data. The antennas transfer corresponding electrical uplink signals through duplexers to the amplifiers. The amplifiers boost the electrical uplink signals for filters which attenuate unwanted energy. Demodulators down-convert the filtered uplink signals from their carrier frequency. The analog/digital interfaces convert the demodulated analog uplink signals into digital uplink signals for the DSPs. The DSPs recover uplink 5GNR symbols from the uplink digital signals. In 5GNR BBU 423, the CPU executes the network applications to process the uplink 5GNR symbols and recover the uplink 5GNR signaling and the uplink 5GNR data. The network applications process the uplink 5GNR signaling and downlink Fifth Generation Core (5GC) signaling to generate new uplink 5GC signaling, new downlink 5GNR signaling, and new X2 signaling. The RRC transfers the new uplink 5GC signaling to NFVI 430 and the X2 signaling to other NodeBs. The SDAP transfers corresponding 5GC data to NFVI 430 and the other NodeBs.

In 5GNR BBU 423, the RRC receives the 5GC signaling from NFVI 430 and X2 signaling from the other NodeBs. The SDAP receives 5GC data from NFVI 430 and the other NodeBs. The 5GNR network applications process the 5GNR signaling and data to generate corresponding downlink 5GNR symbols that carry the 5GNR signaling and data. In 5GNR radios 421-422, the DSP processes the downlink 5GNR symbols to generate corresponding digital signals for the analog-to-digital interfaces. The analog-to-digital interfaces convert the digital signals into analog signals for modulation. Modulation up-converts the analog signals to their carrier frequency. The amplifiers boost the modulated signals for the filters which attenuate unwanted out-of-band energy. The filters transfer the filtered electrical signals through duplexers to the antennas. The filtered electrical signals drive the antennas to emit corresponding wireless signals to UEs 401 that transport the downlink 5GNR signaling and data.

RRC functions comprise authentication, security, handover control, status reporting, Quality-of-Service (QoS), network broadcasts and pages, and network selection. SDAP functions comprise QoS marking and flow control. PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARM), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, channel coding/decoding, channel estimation/equalization, and rate matching/de-matching, scrambling/descrambling, modulation mapping/de-mapping, layer mapping/de-mapping, precoding, Resource Element (RE) mapping/de-mapping, Fast Fourier Transforms (FFTs)/Inverse FFTs (IFFTs), and Discrete Fourier Transforms (DFTs)/Inverse DFTs (IDFTs).

5GNR radios 421-422 wirelessly exchange user data with several 5GNR UEs (not shown). 5GNR radios 421-422 and BBU 423 exchange the user data over enhanced Common Public Radio Interface (eCPRI) links. BBU 423 and NFVI 430 exchange the user data over backhaul links. NFVI 430 and external systems exchange some of the user data over external links. 5GNR BBU 423 determines the running average of the downlink throughput for the backhaul links. BBU 423 also determines the radio channel sizes and radio channel occupancies for 5GNR radios 421-422.

5GNR BBU 423 selects a DRX schedule for UE 401 over 5GNR radio 421 based on the backhaul performance, channel size, and channel occupancy for 5GNR radio 421. BBU 423 selects another DRX schedule for UE 401 over 5GNR radio 422 based on the backhaul performance, channel size, and channel occupancy for 5GNR radio 422. BBU 423 transfers the DRX schedule for radio 5GNR 401 to radio 421 and transfers the other DRX schedule for radio 5GNR 422 to radio 422. 5GNR radios 421-422 wirelessly transfers their respective DRX schedules to UE 401. UE 401 powers on and powers off wireless 5GNR receivers in radios 421-422 per their individual DRX schedules. The 5GNR transmitters in radios 421-422 are powered down and remain so until needed.

5GNR BBU 423 increases the DRX off-time for UE 401 in response to declining backhaul performance, smaller channel size, and/or higher channel occupancy. BBU 423 decreases DRX off-time for UE 401 in response to improving backhaul performance, larger channel size, and/or lower channel occupancy. Some factors may offset each other like when large channel size is offset by poor backhaul performance and the DRX off-time may stay the same. The DRX schedules have other timing rules in addition to the off-time that may be selected in a similar manner. The backhaul performance for 5GNR radios 421-422 is typically the same as they often share backhaul links, although backhaul performance for 5GNR radios 421-422 may be individually measured and will differ in some scenarios. The radio channel sizes may be the same or be different, and the channel occupancies typically differ by some margin based on respective live UE loading.

NFVI 430 receives user data for delivery to UE 401. NFVI 430 transfers the user data to 5GNR BBU 423. 5GNR BBU 423 waits for UE 401 to receive per one of the DRX schedules. When UE 101 is receiving per one of the DRX schedules, BBU 423 transfers a data notice to one of radios 421-422. In some examples, BBU 423 waits for UE 401 to receive over a specific one of radios 421-422 that is used for a given data service that is associated with the user data. The corresponding one of radios 421-422 wirelessly transfers the data notice to UE 401. UE 401 wirelessly receives the data notice per the pertinent DRX schedule for the corresponding one of radios 421-422. BBU 423 then transfers the user data for UE 401 to the corresponding one of radios 421-422 per the pertinent DRX schedule and the data notice. The corresponding one of radios 421-422 wirelessly transmits the user data to UE 401. UE 401 wirelessly receives the user data per the pertinent DRX schedule and the data notice.

Figure 5:
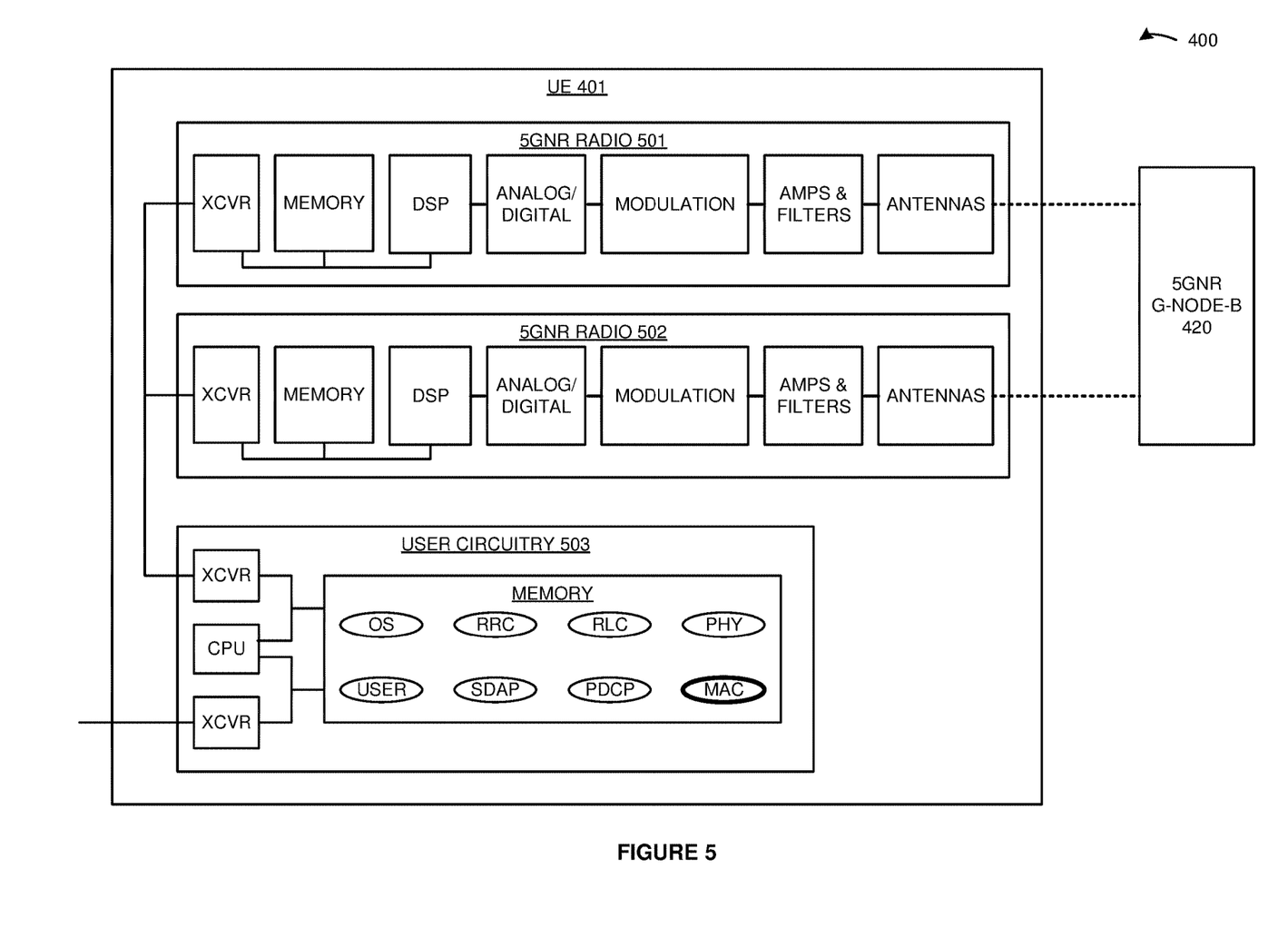
FIG. 5 illustrates the 5GNR UE that has its DRX controlled by the 5GNR gNodeB.

FIG. 5 illustrates 5GNR UE 401 that has its DRX controlled by 5GNR gNodeB 420. UE 401 comprises an example of UEs 101-103 and other UEs served by gNodeB 420, although UEs 101-103 and the other UEs may differ. UE 401 comprises 5GNR radios 501-502 and user circuitry 503. 5GNR radios 501-502 comprises antennas, amplifiers, filters, modulation, analog-to-digital interfaces, DSP, memory, and transceivers that are coupled over bus circuitry. User circuitry 503 comprises memory, CPU, and transceivers that are coupled over bus circuitry. The memory in user circuitry 503 stores an operating system, user applications (USER), and 5GNR network applications for PHY, MAC, RLC, PDCP, SDAP, and RRC. The antennas in 5GNR radio 501 are wirelessly coupled to the antennas in 5GNR radio 421 in 5GNR gNodeB 420. The antennas in 5GNR radio 502 are wirelessly coupled to the antennas in 5GNR radio 422 in 5GNR gNodeB 420. Transceivers in 5GNR radios 501-502 are coupled to transceivers in user circuitry 503. A transceiver in user circuitry 503 is typically coupled to external user systems like displays, controllers, and memory. The CPU in user circuitry 503 executes the operating system, PHY, MAC, RLC, PDCP, SDAP, and RRC to exchange 5GNR signaling and data with 5GNR gNodeB 420 over 5GNR radios 501-502.

In 5GNR radios 501-502, the antennas receive wireless signals from 5GNR gNodeB 420 that transport downlink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequency. The analog/digital interfaces convert the demodulated analog signals into digital signals for the DSPs. The DSPs transfer corresponding 5GNR symbols to user circuitry 503 over the transceivers. In user circuitry 503, the CPU executes the network applications to process the 5GNR symbols and recover the downlink 5GNR signaling and data. The 5GNR network applications receive new uplink signaling and data from the user applications. The network applications process the uplink user signaling the downlink 5GNR signaling to generate new downlink user signaling and new uplink 5GNR signaling. The network applications transfer the new downlink user signaling and data to the user applications.

The 5GNR network applications process the new uplink 5GNR signaling and user data to generate corresponding uplink 5GNR symbols that carry the uplink 5GNR signaling and data. In 5GNR radios 501-502, the DSPs process the uplink 5GNR symbols to generate corresponding digital signals for the analog-to-digital interfaces. The analog-to-digital interfaces convert the digital uplink signals into analog uplink signals for modulation. Modulation up-converts the uplink analog signals to their carrier frequency. The amplifiers boost the modulated uplink signals for the filters which attenuate unwanted out-of-band energy. The filters transfer the filtered uplink signals through duplexers to the antennas. The electrical uplink signals drive the antennas to emit corresponding wireless 5GNR signals to 5GNR NodeB 420 that transport the uplink 5GNR signaling and data.

RRC functions comprise authentication, security, handover control, status reporting, QoS, network broadcasts and pages, and network selection. SDAP functions comprise QoS marking and flow control. PDCP functions comprise security ciphering, header compression and decompression, sequence numbering and re-sequencing, de-duplication. RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, channel coding/decoding, channel estimation/equalization, and rate matching/de-matching, scrambling/descrambling, modulation mapping/de-mapping, layer mapping/de-mapping, precoding, RE mapping/de-mapping, FFTs/IFFTs, and DFTs/IDFTs.

User circuitry 503 receives a DRX schedule for 5GNR radio 501 from 5GNR gNodeB 420 over radio 501. User circuitry 503 receives another DRX schedule for 5GNR radio 502 from 5GNR gNodeB 420 over radio 502. The DRX schedules indicate when user circuitry 503 powers-up the wireless receivers in 5GNR radios 501-502 to check network signaling and when user circuitry 503 powers-down the wireless receivers in 5GNR radios 501-502 to save battery power. User circuitry 503 powers-up the receiver in 5GNR radio 501 to check network signaling per its DRX schedule. User circuitry 503 powers-up the receiver in 5GNR radio 502 to check network signaling per its DRX schedule. User circuitry 503 receives data notices over 5GNR radio 501 per its DRX schedule. User circuitry 503 then receives user data over 5GNR radio 501 per the DRX schedule and the data notices. Likewise, user circuitry 503 receives other data notices over 5GNR radio 502 per its DRX schedule and then receives user data over 5GNR radio 502 per the other DRX schedule and data notices.

Figure 6:
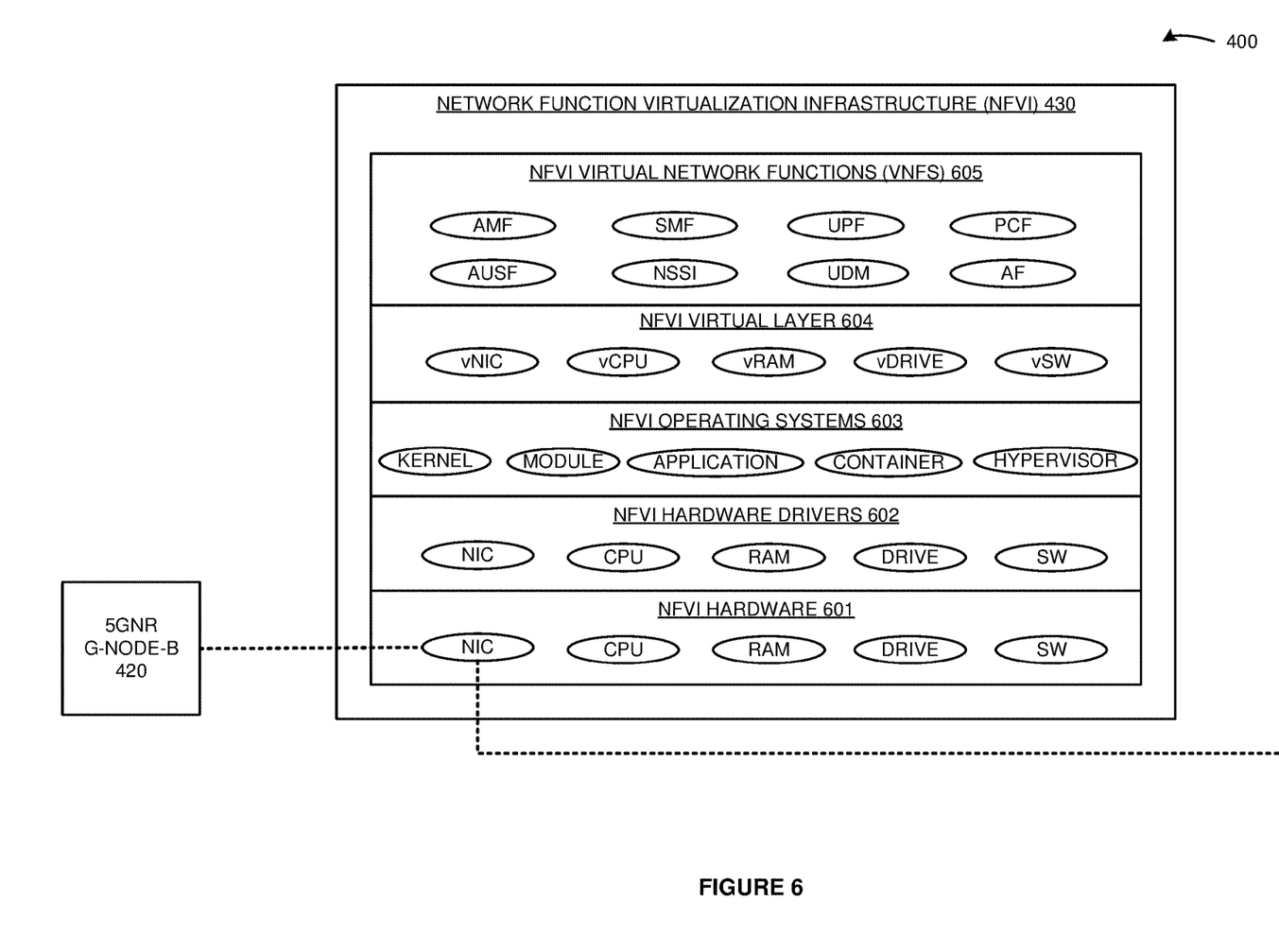
FIG. 6 illustrates a Fifth Generation Core Network Function Virtualization Infrastructure (5GC NFVI) that serves the 5GNR UE over the 5GNR gNodeB which controls 5GNR DRX for the 5GNR UE.

FIG. 6 illustrates Fifth Generation Core Network Function Virtualization Infrastructure (5GC NFVI) 430 that serves 5GNR UE 401 over 5GNR gNodeB 420 which controls DRX for 5GNR UE 401. NFVI 430 comprises an example of network elements 130, although network elements 130 may differ. NFVI 430 comprises NFVI hardware 601, NFVI hardware drivers 602, NFVI operating systems 603, NFVI virtual layer 604, and NFVI Virtual Network Functions (VNFs) 605. NFVI hardware 601 comprises Network Interface Cards (NIC), CPU, RAM, flash/disk drives, and data switches (SW). NFVI hardware drivers 602 comprise software that is resident in the NIC, CPU, RAM, DRIVE, and SW. NFVI operating systems 603 comprise kernels, modules, applications, containers, hypervisors, and the like. NFVI virtual layer 604 comprises virtual NICs (vNIC), virtual CPUs (vCPU), virtual RAM (vRAM), virtual Drives (vDRIVE), and virtual Switches (vSW). NFVI VNFs 605 comprise Access and Mobility Management Functions (AMF), Session Management Functions (SMF), User Plane Functions (UPF), Policy Control Functions (PCF), Authentication and Security Functions (AUSF), Network Slice Selection Functions (NSSF), User Data Management Functions (UDM), and Application Functions (AF). Other VNFs are typically present but are omitted for clarity. The NIC are coupled to 5GNR gNodeB 420 and external systems. NFVI hardware 601 executes NFVI hardware drivers 602, NFVI operating systems 603, NFVI virtual layer 604, and NFVI VNFs 605 to serve UE 401 and other UEs over 5GNR gNodeB 420 and other NodeBs. NFVI 430 exchanges user data and 5GC signaling with 5GNR gNodeB 420 and other NodeBs to serve wireless data services to UE 401 and the other UEs. NFVI 430 exchanges some of the user data with external systems.

Figure 7:
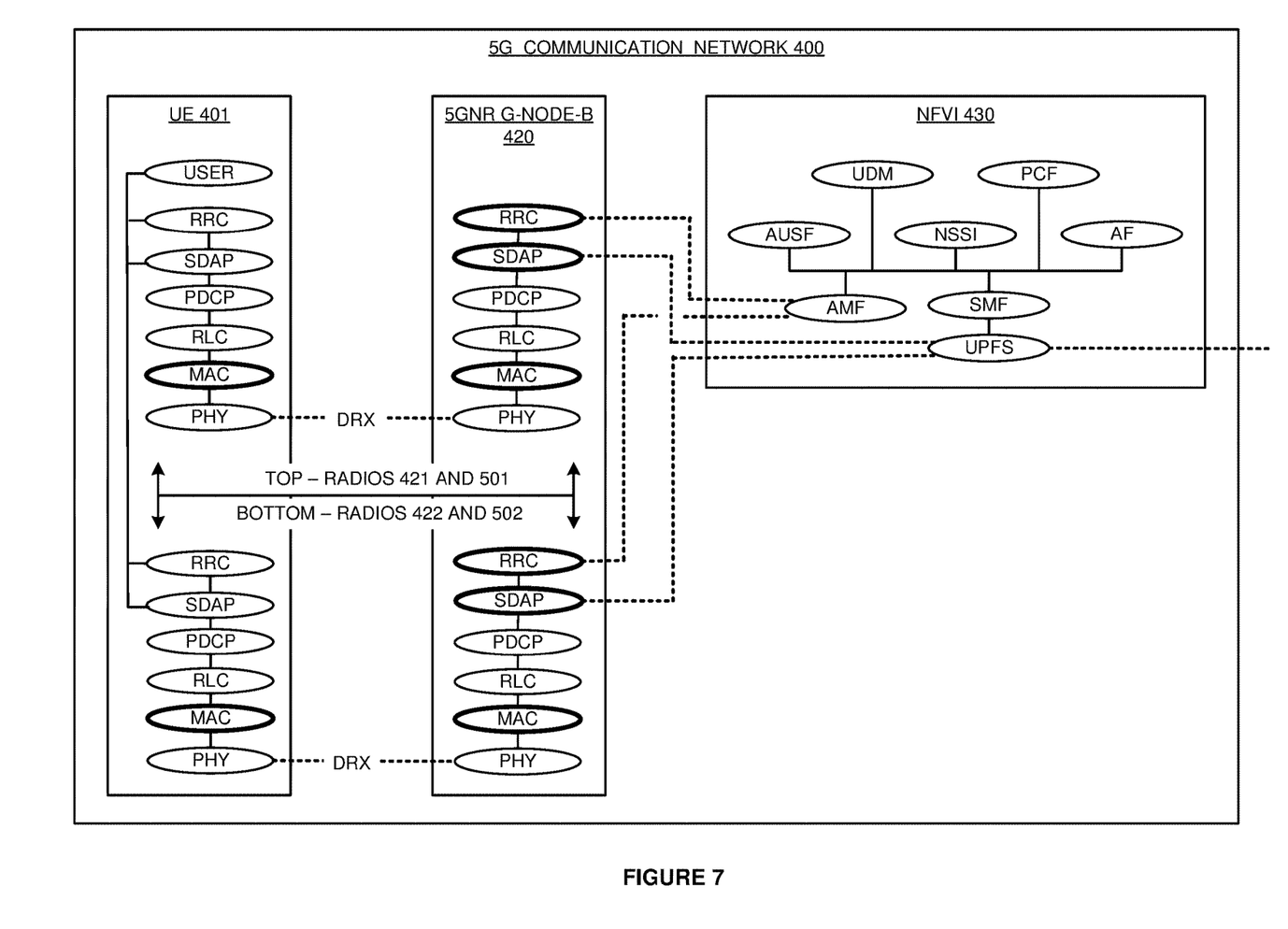
FIG. 7 illustrates an exemplary operation of the 5G wireless communication network to control 5GNR DRX for the 5GNR UE.

FIG. 7 illustrates an exemplary operation of 5G wireless communication network 400 to control 5GNR DRX for 5GNR UE 401. The illustrated operation is exemplary and may vary from FIG. 7 in other examples. The 5GNR network applications (RRC, SDAP, PDCP, RLC, MAC, and PHY) shown at the top of UE 401 and gNodeB 420 use 5GNR radios 421 and 501. The 5GNR network applications (RRC, SDAP, PDCP, RLC, MAC, and PHY) shown at the bottom of UE 401 and gNodeB 420 use 5GNR radios 422 and 502.

The top 5GNR RRC in UE 401 attaches to the top 5GNR RRC in 5GNR gNodeB 420 and indicates multi-radio capability for UE 401. The top 5GNR RRC in gNodeB 420 exchanges 5GC signaling with the AMF in NFVI 430 and indicates the multi-radio capability. The AMF interacts with the AUSF and UDM to authenticate and authorize UE 401 for services using the multi-radio capability. The AMF interacts with the NSSI, SMF, and PCF to select QoS, network addressing, and the like to deliver the services to UE 401. The SMF directs a UPF to serve UE 401 over 5GNR gNodeB 420. The AMF signals the top RRC in 5GNR gNodeB 420 to serve UE 401 per the QoS and network addresses and to direct UE 401 to attach to the bottom RRC in gNodeB 420. The top RRC in 5GNR gNodeB 420 signals the top RRC in UE 401 indicating the selected services, QoS, network addresses, and additional radio attachment.

The top RRC in UE 401 directs the bottom RRC in UE 401 to attach to the bottom RRC in 5GNR gNodeB 420. The bottom 5GNR RRC in UE 401 attaches to the bottom 5GNR RRC in 5GNR gNodeB 420 to implement the multi-radio capability. The bottom 5GNR RRC in gNodeB 420 exchanges 5GC signaling with the AMF in NFVI 430. The AMF interacts with the NSSI, SMF, and PCF to select QoS, network addressing, and the like for UE 401. The SMF directs a UPF to serve UE 401 over 5GNR gNodeB 420. The AMF signals the bottom RRC in 5GNR gNodeB 420 to serve UE 401 per the QoS and network addresses. The bottom RRC in 5GNR gNodeB 420 signals the bottom RRC in UE 401 indicating the selected services, QoS, and network addresses.

The user applications in UE 401 exchange user signaling with the RRCs over the operating system and exchange user data with the SDAPs over the operating system. The RRCs in UE 401 and the RRCs in 5GNR gNodeB 420 exchange 5GNR signaling to establish the selected services per the QoS. The SDAPs in UE 401 and the SDAPs in 5GNR gNodeB 420 exchange the user data to deliver the selected services per the QoS. The SDAPs in 5GNR gNodeB 420 and the UPFs in NFVI 430 exchange the user data to deliver the selected services per the QoS. The UPFs in NFVI 430 and external systems exchange the user data to deliver the selected services per the QoS.

The SDAPs in 5GNR gNodeB 420 wirelessly exchange user data with the SDAPs in other 5GNR UEs (not shown). The SDAPs in 5GNR gNodeB 420 and the UPFs in NFVI 430 exchange the user data over backhaul links. The UPFs in NFVI 430 and external systems exchange some of the user data over external links. The SDAPs in 5GNR gNodeB 420 determine their average downlink throughput from the UPFs in NFVI 430. The SDAPs indicate their average downlink throughput to their corresponding MACs. The MACs in 5GNR gNodeB 420 determine their channel sizes and channel occupancy. The channel occupancy comprises a number or percent of 5GNR resource blocks in the channel that are in-use as opposed to the 5GNR resource blocks that are not used.

The top MAC in 5GNR gNodeB 420 selects a DRX schedule for the top MAC in UE 401 based on their downlink throughput, channel size, and channel occupancy. The top MAC in 5GNR gNodeB 420 signals the DRX schedule to the top MAC in UE 401. The top MAC in UE 401 powers up and down 5GNR radio 501 to check 5GNR signaling per the DRX schedule.

The bottom MAC in 5GNR gNodeB 420 selects another DRX schedule for the bottom MAC in UE 401 based on their downlink throughput, channel size, and channel occupancy. The bottom MAC in 5GNR gNodeB 420 signals the other DRX schedule to the bottom MAC in UE 401. The bottom MAC in UE 401 powers up and down 5GNR radio 502 to check 5GNR signaling per the other DRX schedule.

The MACs in 5GNR gNodeB 420 increase DRX off-time for UE 401 in response to declining backhaul performance, smaller channel size, and/or higher channel occupancy. The MACs in 5GNR gNodeB 420 decrease DRX off-time for UE 401 in response to improving backhaul performance, larger channel size, and/or lower channel occupancy. Some factors may offset like a small channel size being offset by low channel occupancy. The DRX schedules have other timing rules in addition to the off-time that are controlled in a similar manner.

The UPFs in NFVI 430 receive user data for delivery to UE 401. The UPFs transfer the user data to the SDAPs in 5GNR gNodeB 420. The SDAPs transfer the user data to the MACs in gNodeB 420. The MACs wait for their corresponding MACs in UE 401 to receive per their DRX schedules. When a MAC in UE 401 is receiving per its DRX schedule, the corresponding MAC in 5GNR gNodeB 420 transfers data notices to the receiving MAC in UE 401. When the MAC in UE 401 is receiving per its DRX schedule and the data notices, the corresponding MAC in 5GNR gNodeB 420 transfers the user data to its MAC in UE 401. The MACs in UE 401 transfer their user data to the user applications over the SDAPs.

Figure 8:
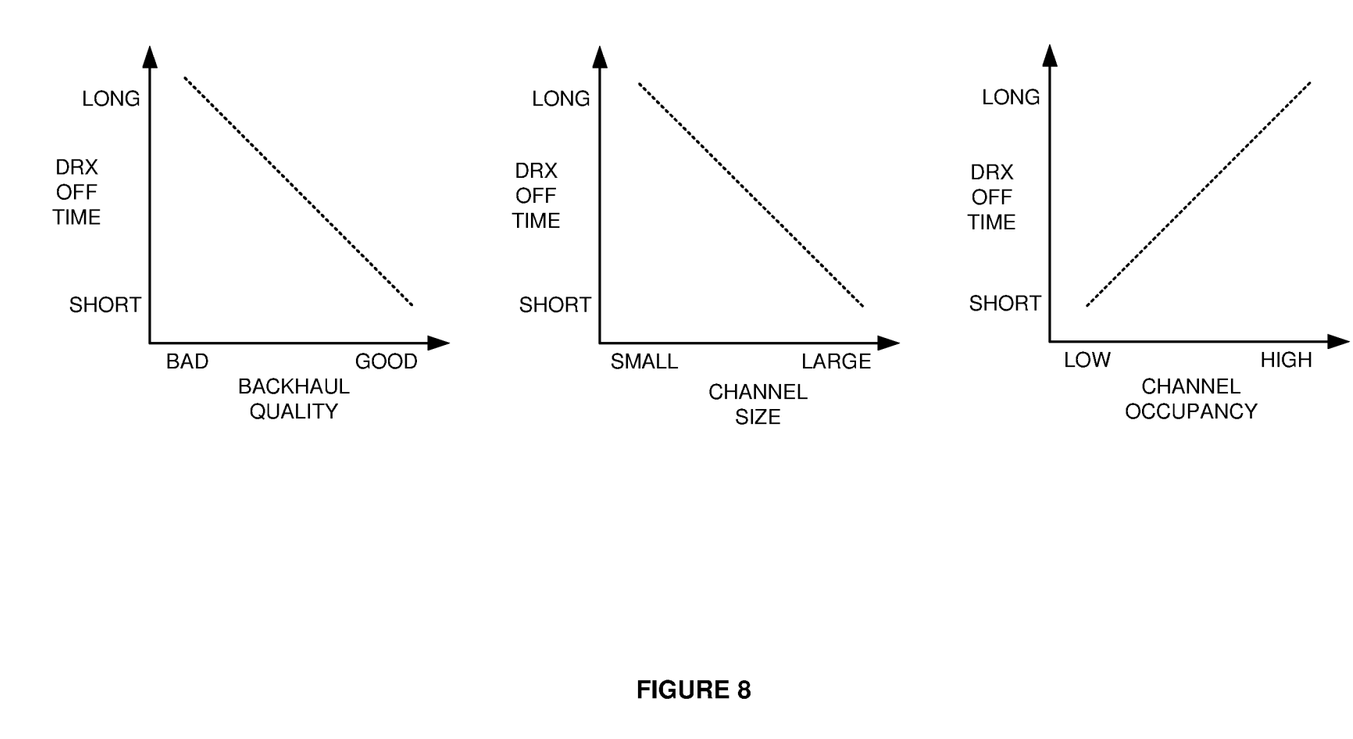
FIG. 8 illustrates an exemplary operation of the 5GNR gNodeB to control 5GNR DRX for the 5GNR UE.

FIG. 8 illustrates an exemplary operation of 5GNR gNodeB 420 to control 5GNR DRX for 5GNR UE 401. FIG. 8 depicts three graphs that all have DRX off-time on the vertical axis. The left graph has backhaul quality as the horizontal axis. The middle graph has channel size as the horizontal axis. The right graph has channel occupancy as the horizontal axis. In the left graph, bad backhaul quality correlates to a long DRX off-time, and good backhaul quality correlates to a short DRX off-time. In the middle graph, small channel size correlates to a long DRX off-time, and large channel size quality correlates to a short DRX off-time. In the right graph, a low channel occupancy correlates to a short DRX off-time, and large channel occupancy quality correlates to a large DRX off-time. The graphs could be reduced to data structures that are hosted by the 5GNR in 5GNR gNodeB 420 and used to select DRX schedule data like DRX off-times. The results of the data structures could be weighted and averaged to develop a composite DRX off-time from multiple inputs.

The wireless data network circuitry described above comprises computer hardware and software that form special-purpose network circuitry to control DRX for UEs. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to control DRX for the UEs.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless access node to control Discontinuous Reception (DRX) for an individual User Equipment (UE), the method comprising:
    baseband circuitry exchanging initial data with network elements over at least one backhaul link and determining the data communication performance of the at least one backhaul link;
    the baseband circuitry selecting a DRX schedule having a different DRX off time for the UE than a current DRX schedule for the UE based on the data communication performance of the at least one backhaul link and transferring the DRX schedule to a radio;
    the radio receiving the DRX schedule from the baseband circuitry and wirelessly transferring the DRX schedule to the UE, wherein the UE wirelessly receives the DRX schedule and powers-up a wireless receiver and powers-down the wireless receiver per the DRX schedule;
    the baseband circuitry transferring a data notice for the UE to the radio per the DRX schedule;
    the radio receiving the data notice from the baseband circuitry and wirelessly transmitting the data notice to the UE, wherein the UE wirelessly receives the data notice per the DRX schedule;
    the baseband circuitry transferring user data for the UE to the radio over a radio channel per the DRX schedule and the data notice; and
    the radio wirelessly transmitting the user data to the UE, wherein the UE wirelessly receives the user data over the radio channel per the DRX schedule and the data notice.

2. The method of claim 1 wherein the baseband circuitry selecting the DRX schedule based on the data communication performance of the at least one backhaul link comprises increasing an amount of DRX off-time for the UE responsive to a quality decrease in the data communication performance of the at least one backhaul link.

3. The method of claim 1 wherein the baseband circuitry selecting the DRX schedule based on the data communication performance of the at least one backhaul link comprises decreasing an amount of DRX off-time for the UE responsive to a quality increase in the data communication performance of the at least one backhaul link.

4. The method of claim 1 wherein the baseband circuitry selecting the DRX schedule based on the data communication performance of the at least one backhaul link comprises selecting the DRX schedule based on the radio channel and the data communication performance of the at least one backhaul link.

5. The method of claim 1 further comprising the baseband circuitry determining a channel size for the radio channel and wherein the baseband circuitry selecting the DRX schedule based on the data communication performance of the at least one backhaul link comprises selecting the DRX schedule based on the channel size of the radio channel and the data communication performance of the at least one backhaul link.

6. The method of claim 1 further comprising the baseband circuitry determining a channel occupancy for the radio channel and wherein the baseband circuitry selecting the DRX schedule based on the data communication performance of the at least one backhaul link comprises selecting the DRX schedule based on the channel occupancy of the radio channel and the data communication performance of the at least one backhaul link.

7. The method of claim 1 further comprising:
    the baseband circuitry selecting another DRX schedule for the UE based on another radio channel and the data communication performance of the at least one backhaul link and transferring the other DRX schedule to another radio;
    the other radio receiving the other DRX schedule from the baseband circuitry and wirelessly transferring the other DRX schedule to the UE, wherein the UE wirelessly receives the other DRX schedule and powers-up another wireless receiver and powers-down the other wireless receiver per the other DRX schedule;
    the baseband circuitry transferring another data notice for the UE to the other radio per the other DRX schedule;
    the other radio receiving the other data notice from the baseband circuitry and wirelessly transmitting the other data notice to the UE, wherein the UE wirelessly receives the other data notice per the other DRX schedule;
    the baseband circuitry transferring other user data for the UE to the other radio per the other DRX schedule and the other data notice; and the other radio wirelessly transmitting the other user data to the UE over the other radio channel, wherein the UE wirelessly receives the other user data over the other radio channel per the other DRX schedule and the other data notice.

8. The method of claim 7 further comprising the baseband circuitry determining a channel size for the other radio channel and wherein the baseband circuitry selecting the other DRX schedule based on the other radio channel and the data communication performance of the at least one backhaul link comprises selecting the other DRX schedule based on the channel size of the other radio channel and the data communication performance of the at least one backhaul link.

9. The method of claim 7 further comprising the baseband circuitry determining a channel occupancy for the other radio channel and wherein the baseband circuitry selecting the other DRX schedule based on the other radio channel and the data communication performance of the at least one backhaul link comprises selecting the other DRX schedule based on the channel occupancy of the other radio channel and the data communication performance of the at least one backhaul link.

10. The method of claim 1 wherein the wireless access node comprises a Fifth Generation New Radio (5GNR) access node.

11. A wireless access node to control Discontinuous Reception (DRX) for an individual User Equipment (UE), the wireless access node comprising:
baseband circuitry configured to exchange initial data with network elements over at least one backhaul link and determine the data communication performance of the at least one backhaul link;
the baseband circuitry configured to select a DRX schedule having a different DRX off time for the UE than a current DRX schedule for the UE based on the data communication performance of the at least one backhaul link and transfer the DRX schedule to a radio;
the radio configured to receive the DRX schedule from the baseband circuitry and wirelessly transfer the DRX schedule to the UE, wherein the UE is configured to wirelessly receive the DRX schedule and power-up a wireless receiver and power-down the wireless receiver per the DRX schedule;
the baseband circuitry configured to transfer a data notice for the UE to the radio per the DRX schedule;
the radio configured to receive the data notice from the baseband circuitry and wirelessly transmit the data notice to the UE, wherein the UE is configured to wirelessly receive the data notice per the DRX schedule;
the baseband circuitry configured to transfer user data for the UE to the radio over a radio channel per the DRX schedule and the data notice; and
the radio configured to wirelessly transmit the user data to the UE, wherein the UE is configured to wirelessly receive the user data over the radio channel per the DRX schedule and the data notice.

12. The wireless access node of claim 11 wherein the baseband circuitry is configured to increase an amount of DRX off-time for the UE responsive to a quality decrease in the data communication performance of the at least one backhaul link.

13. The wireless access node of claim 11 wherein the baseband circuitry is configured to decrease an amount of DRX off-time for the UE responsive to a quality increase in the data communication performance of the at least one backhaul link.

14. The wireless access node of claim 11 wherein the baseband circuitry is configured to select the DRX schedule based on the radio channel and the data communication performance of the at least one backhaul link.

15. The wireless access node of claim 11 further comprising the baseband circuitry configured to determine a channel size for the radio channel and select the DRX schedule based on the channel size of the radio channel and the data communication performance of the at least one backhaul link.

16. The wireless access node of claim 11 further comprising the baseband circuitry configured to determine a channel occupancy for the radio channel and select the DRX schedule based on the channel occupancy of the radio channel and the data communication performance of the at least one backhaul link.

17. The wireless access node of claim 11 further comprising:
the baseband circuitry configured to select another DRX schedule for the UE based on another radio channel and the data communication performance of the at least one backhaul link and to transfer the other DRX schedule to another radio;
the other radio configured to receive the other DRX schedule from the baseband circuitry and wirelessly transfer the other DRX schedule to the UE, wherein the UE is configured to wirelessly receive the other DRX schedule and power-up another wireless receiver and power-down the other wireless receiver per the other DRX schedule;
the baseband circuitry configured to transfer another data notice for the UE to the other radio per the other DRX schedule;
the other radio configured to receive the other data notice from the baseband circuitry and wirelessly transmit the other data notice to the UE, wherein the UE is configured to wirelessly receive the other data notice per the other DRX schedule;
the baseband circuitry is configured to transfer other user data for the UE to the other radio per the other DRX schedule and the other data notice; and
the other radio is configured to wirelessly transmit the other user data to the UE over the other radio channel, wherein the UE is configured to wirelessly receive the other user data over the other radio channel per the other DRX schedule and the other data notice.

18. The wireless access node of claim 17 further comprising the baseband circuitry configured to determine a channel size for the other radio channel and wherein the baseband circuitry is configured to select the other DRX schedule based on the channel size of the other radio channel and the data communication performance of the at least one backhaul link.

19. The wireless access node of claim 17 further comprising the baseband circuitry configured to determine a channel occupancy for the other radio channel and wherein the baseband circuitry is configured to select the other DRX schedule based on the channel occupancy of the other radio channel and the data communication performance of the at least one backhaul link.

20. The wireless access node of claim 11 wherein the wireless access node comprises a Fifth Generation New Radio (5GNR) access node.

* * * * *